Sept. 21, 1965     A. F. BOHNHOFF     3,206,995

BALL BEARING SCREW ASSEMBLY

Filed April 16, 1962

INVENTOR.
Arthur F. Bohnhoff
BY
Bruce Beecker
ATTORNEY

United States Patent Office 3,206,995
Patented Sept. 21, 1965

3,206,995
BALL BEARING SCREW ASSEMBLY
Arthur F. Bohnhoff, Saginaw, Mich., assignor to General Motors Corporation, Detroit, Mich., a corporation of Delaware
Filed Apr. 16, 1962, Ser. No. 187,787
3 Claims. (Cl. 74—459)

This invention relates to an improvement in screw and nut devices of the type in which the complementary helical threads of the screw and nut provide a race for a ball train constituting the connection between the two parts.

In its most particular aspect, the invention has in contemplation extremely small ball nut and screw assemblies possessed of unusually high efficiency and accuracy. Thus, in accordance therewith, a miniature, light-weight assembly with only 9/16" ball circle diameter having upwards of 90% efficiency has been produced and found capable of positioning mechanical components within .0005" for each inch of lineal travel of the ball nut or screw.

The invention opens up very interesting possibilities in the areas of electronic controls, radar tuners, missile and rocket guidance and telemetering systems, automatic switching devices and many other engineering applications where critical positioning problems are encountered along with stringent space and weight limitations.

The principal objects of the invention being implicit in the foregoing, the same will now be described in point of a preferred embodiment thereof illustrated by the accompanying drawings wherein.

Figure 1:
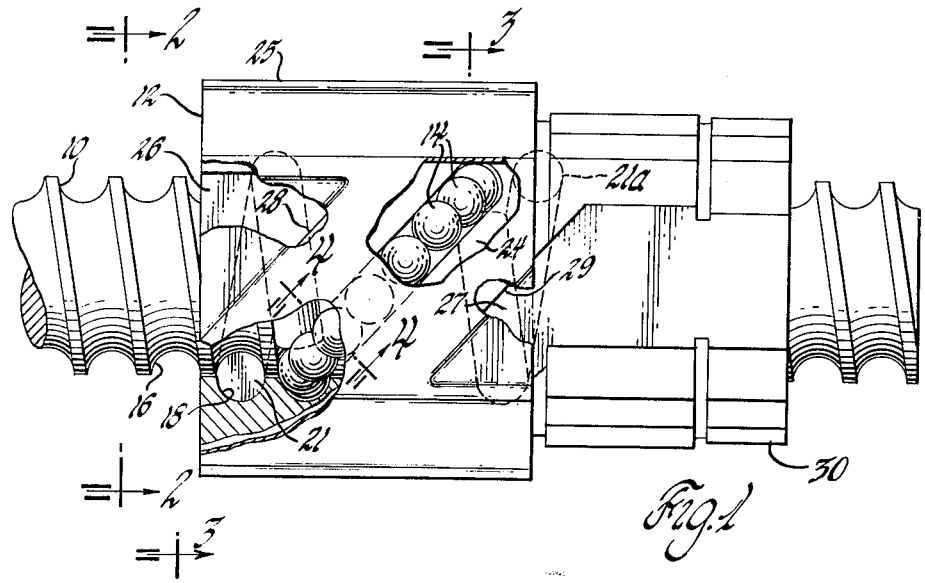
FIGURE 1 is an assembly view with both the screw and nut shown broken away.
Figure 2:
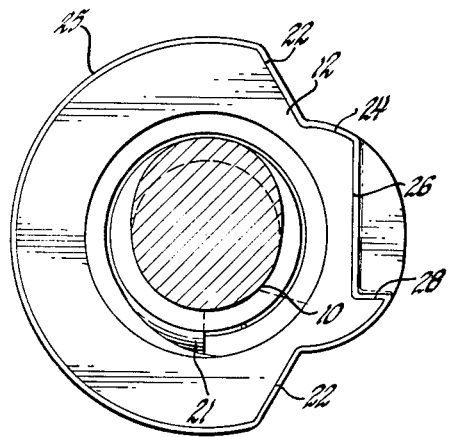
FIGURE 2 is a view on the line 2—2 in FIGURE 1.
Figure 3:
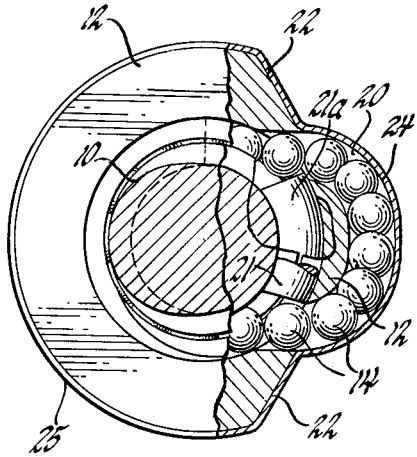
FIGURE 3 is a view on the line 3—3 in FIGURE 1.
Figure 4:
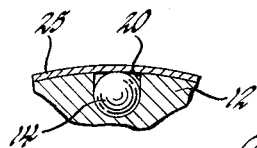
FIGURE 4 is a fragmentary section taken on the line 4—4 in FIGURE 1.

In the drawings, the numerals 10 and 12 respectively denote the screw and nut components of the assembly which further comprises balls 14. The latter fill the helical race provided by the groove 16 of the screw and the groove 18 of the nut.

For recirculation of the balls 14, the nut 12 has therein an exterior groove 20, the same being formed arcuately on a changing radius to preclude any possibility of jamming of the balls. The machining operation on the nut required to achieve this arcuation yields two axial flats 22 spaced by the rounded portion 24 in which the groove 20 is disposed. Such groove will be observed as extending diagonally of the body of the nut thereby to interconnect the ends of the working portion of the interior helical groove 18 thereof.

As well understood in the art, if one of the screw and nut is held against axial movement and is free to be rotated relative to the other, such other part will be caused to move lineally if restrained against rotary movement. In the particular application contemplated, the nut is connected to the load and for the purpose of the connection comprises an integral adaptor 30.

With the assembly in operation, the rolling balls are deflected into and out of the passage 20 by elements 21 and 21a which are secured in the groove of the nut. These elements are the subject of U.S. Patent No. 2,995,948 to David A. Galonska et al.

To retain the balls as they course the passage 20 the body of the nut is surrounded by a sleeve 25 which with such passage takes the place of the usual return or transfer tube characterizing conventional ball nut and screw construction—see, for example, Hawkins Patent 2,267,524. Such a return or transfer tube would be difficult to fabricate in miniature and, moreover, would be unacceptable in many applications calling for a miniature design, because of space limitations. It is to be noted that the design herein accomplishes the recirculation of the balls without any increase in the diameter of the ball nut, the blank for which is cut from a cylindrical rod. Using a conventional transfer tube, the same would constitute a protuberance on the cylindrical body of the nut, thereby increasing the space required for its containment.

At assembly of the nut 12, the sleeve 25, which as initially formed is cylindrical, is securely crimped about the nut. No soldering such as is required in the case of miniature ball nut and screw designs heretofore proposed is necessary. Flats 22 effectively preclude any possibility of rotation of the sleeve relative to the nut. To prevent any axial shifting of the sleeve the nut is provided with flats 26 and 27, yielding shoulders 28 and 29 abutted by the sleeve.

While it will be apparent that the preferred embodiment herein illustrated is well calculated to fulfill the objects above stated, it will be appreciated that the invention is suceptible to modification, variation and change without departing from the proper scope or fair meaning of the subjoined claims.

What is claimed is:

1. An assembly comprising a screw carrying a nut interconnected to the screw through a train of balls utilizing the helical groove of the screw and the helical groove of the nut as a race, said nut being exteriorly formed with a pair of axial flats each lying on a geometrical plane and a rounded portion intersected by the geometrical planes of said flats, said rounded portion having an arcuate groove therein conforming to the cruvature of said rounded portion providing for recirculation of said balls to and from said race, said arcuate groove extending diagonally across the body of the nut and being covered by a sleeve crimped to conform to said rounded portion and said sleeve also being crimped to engage said flats to prevent relative rotation between said sleeve and nut.

2. An assembly comprising a screw carrying a nut interconnected to the screw through a train of balls utilizing the helical groove of the screw and the helical groove of the nut as a race, said nut being exteriorly formed with a pair of axial flats each lying on a geometrical plane and a rounded portion intersected at its exterior contour by the geometrical planes of said flats, and said rounded portion having an arcuate groove therein having the same curvature as said rounded portion providing for recirculation of said balls to and from said race, said arcuate groove extending diagonally across the body of the nut and being covered by a sleeve crimped to conform to said rounded portion to provide a confined arcuate path extending from the intersection of the exterior contour of said rounded portion with the geometrical plane of one of said flats to the intersection of the exterior contour of said rounded portion with the geometrical plane of the other of said flats and said sleeve also being crimped to conform to said flats to prevent relative rotation between said sleeve and nut.

3. An assembly according to claim 2 in which said nut has a pair of additional flats spaced one at either side of said arcuate groove, said additional flats providing shoulders abutted by the material of said sleeve and operating to prevent axial displacement of the latter on the nut.

References Cited by the Examiner

UNITED STATES PATENTS

| | | | |
|---|---|---|---|
| 1,093,590 | 4/14 | Starbuck | 74—459 |
| 2,227,111 | 12/40 | Sturm | 74—459 |
| 2,478,510 | 8/49 | Stolpe | 74—459 |
| 2,959,978 | 11/60 | Boutwell | 74—459 |
| 2,995,948 | 8/61 | Galonska et al. | 74—459 |

DON A. WAITE, *Primary Examiner.*

BROUGHTON G. DURHAM, *Examiner.*